US011824886B2

(12) United States Patent
Lekies et al.

(10) Patent No.: US 11,824,886 B2
(45) Date of Patent: Nov. 21, 2023

(54) DETERMINING THE EXPOSURE LEVEL OF VULNERABILITIES

(71) Applicant: Google LLC, Mountain View, CA (US)

(72) Inventors: Sebastian Lekies, Zurich (CH); Jean-Baptiste Cid, Zurich (CH)

(73) Assignee: Google LLC, Mountain View, CA (US)

( * ) Notice: Subject to any disclaimer, the term of this patent is extended or adjusted under 35 U.S.C. 154(b) by 223 days.

(21) Appl. No.: 17/244,292

(22) Filed: Apr. 29, 2021

(65) Prior Publication Data

US 2022/0353287 A1 Nov. 3, 2022

(51) Int. Cl.
*H04L 9/40* (2022.01)
(52) U.S. Cl.
CPC ........ *H04L 63/1433* (2013.01); *H04L 63/029* (2013.01); *H04L 63/105* (2013.01); *H04L 63/107* (2013.01)
(58) Field of Classification Search
CPC . H04L 63/1433; H04L 63/029; H04L 63/105; H04L 63/107
See application file for complete search history.

(56) References Cited

U.S. PATENT DOCUMENTS

| 7,530,104 B1* | 5/2009 | Thrower | H04L 63/1433 |
| | | | 713/188 |
| 10,320,750 B1* | 6/2019 | Brandwine | H04L 63/1433 |
| 2006/0272011 A1* | 11/2006 | Ide | H04L 63/1433 |
| | | | 726/5 |
| 2012/0144494 A1 | 6/2012 | Cole et al. | |
| 2017/0149834 A1* | 5/2017 | Botti | H04L 63/1433 |

(Continued)

FOREIGN PATENT DOCUMENTS

WO 2018/058517 A1 4/2018

OTHER PUBLICATIONS

François, J.; Lahmadi, A.; Giannini, V.; Cupif, D.; Beck, F.; Wallrich, B.; "Optimizing internet scanning for assessing industrial systems exposure," 2016 International Wireless Communications and Mobile Computing Conference (IWCMC), Paphos, Cyprus, 2016, pp. 516-522, doi: 10.1109/IWCMC.2016.7577111.*

(Continued)

*Primary Examiner* — Victor Lesniewski
(74) *Attorney, Agent, or Firm* — Honigman LLP; Brett A. Krueger

(57) ABSTRACT

A method includes receiving a scan request requesting to scan a set of network-connected assets designated for a network scan. For each respective network-connected asset, the method includes scanning, at a network security scanner using a first scanning privilege level, the respective network-connected asset. The method includes determining, based on the scan using the first scanning privilege level, whether the respective network-connected asset has a vulnerability. In response, the method includes scanning, at the network security scanner using a second scanning privilege level, the respective network-connected asset. The second scanning privilege level defines a lower level of access the network security scanner has than the first scanning privilege level. The method includes determining, based on the scans, an exposure level of the vulnerability. The method includes reporting the exposure level of the vulnerability to a user of the respective network-connected asset.

22 Claims, 7 Drawing Sheets

(56) References Cited

U.S. PATENT DOCUMENTS

| | | | |
|---|---|---|---|
| 2018/0146002 A1 | 5/2018 | Canfield | |
| 2018/0349613 A1* | 12/2018 | Sullivan | G06F 21/554 |
| 2018/0375892 A1* | 12/2018 | Ganor | H04L 63/20 |
| 2019/0311130 A1* | 10/2019 | Hodgman | H04L 63/1433 |
| 2020/0036741 A1* | 1/2020 | Duchin | G06F 9/45558 |
| 2020/0389483 A1* | 12/2020 | Dye | H05K 999/99 |
| 2020/0404502 A1 | 12/2020 | Trivellato et al. | |
| 2021/0234878 A1* | 7/2021 | Leiderfarb | H04L 63/0236 |
| 2022/0129990 A1* | 4/2022 | Roudaut | H04L 63/1433 |
| 2022/0191230 A1* | 6/2022 | Morgan | H04L 63/1425 |

OTHER PUBLICATIONS

Jul. 21, 2022 Written Opinion (WO) of the International Searching Authority (ISA) and International Search Report (ISR) issued in International Application No. PCT/US2022/025652.

* cited by examiner

DETERMINING THE EXPOSURE LEVEL OF VULNERABILITIES

TECHNICAL FIELD

This disclosure relates to determining the exposure level of vulnerabilities.

BACKGROUND

Vulnerability scanning is common practice to verify the security state of network-connected assets such as servers, routers, load balancers, applications, etc. Identifying vulnerabilities in network-connected assets and determining the associated risk of the identified vulnerabilities is an important aspect of network security. A critical portion of vulnerability assessment includes determining an exposure level of each vulnerability. For example, a vulnerability that is only assessable via a private network is far less dangerous than a vulnerability that is assessable via the Internet.

SUMMARY

One aspect of the disclosure provides a computer-implemented method for determining an exposure level of vulnerabilities. The method, when executed by data processing hardware causes the data processing hardware to perform operations. The operations include receiving a scan request requesting to scan a set of network-connected assets. Each network-connected asset in the set of network-connected assets is designated for a network scan. The method also includes, for each respective network-connected asset in the set of network-connected assets, scanning, at a network security scanner using a first scanning privilege level, the respective network-connected asset and determining, based on the scan of the respective network-connected asset using the first scanning privilege level, whether the respective network-connected asset has a vulnerability. In response to determining that the respective network-connected asset has the vulnerability, the method includes scanning, at the network security scanner using a second scanning privilege level, the respective network-connected asset. The second scanning privilege level defines a lower level of access the network security scanner has to the respective network-connected asset than the first scanning privilege level. The method also includes determining, based on the scan of the respective network-connected asset using the first scanning privilege level and the scan of the respective network-connected asset using the second scanning privilege level, an exposure level of the vulnerability of the respective network-connected asset. The method also includes reporting the exposure level of the vulnerability of the respective network-connected asset to a user of the respective network-connected asset.

Implementations of the disclosure may include one or more of the following optional features. In some implementations, the first and second scanning privilege levels are each associated with a different respective network location relative to the respective network-connected asset. Optionally, the respective network location associated with the first scanning privilege level includes an internal network location. The respective network location associated with the second scanning privilege level may include an external network location.

In some examples, the first scanning privilege level includes a firewall bypass of a firewall associated with the respective network-connected asset. The first and second scanning privilege levels may be among a plurality of scanning privilege levels each defining a different level of access the network security scanner has to the respective network-connected asset and at least one of the plurality of scanning privilege levels may include access credentials providing access to a resource of one or more of the network-connected assets in the set of network-connected assets.

In some implementations, determining the exposure level of the vulnerability includes determining whether the vulnerability is visible to the scan of the respective network-connected asset using the second scanning privilege level. When the vulnerability is visible to the scan of the respective network-connected asset using the second scanning privilege level, the method may include determining that the vulnerability has a first exposure level. When the vulnerability is not visible to the scan of the respective network-connected asset using the second scanning privilege level, the method may include determining that the vulnerability has a second exposure level that is less than the first exposure level.

In some examples, the operations further include performing, based on the exposure level of the vulnerability, a remedial action to mitigate the vulnerability. The operations further may further include, in response to determining that the respective network-connected asset does not have the vulnerability, halting any further scanning of the respective network-connected asset. In some implementations, the first and second scanning privilege levels are among a plurality of scanning privilege levels each defining a different level of access the network security scanner has to the respective network-connected asset and the level of access defined by the first scanning privilege level is higher than the level of access defined by each other scanning privilege level among the plurality of scanning privilege levels.

Another aspect of the disclosure provides a system for determining an exposure level of vulnerabilities. The system includes data processing hardware and memory hardware in communication with the data processing hardware. The memory hardware stores instructions that when executed on the data processing hardware cause the data processing hardware to perform operations. The operations include receiving a scan request requesting to scan a set of network-connected assets. Each network-connected asset in the set of network-connected assets is designated for a network scan. The method also includes, for each respective network-connected asset in the set of network-connected assets, scanning, at a network security scanner using a first scanning privilege level, the respective network-connected asset and determining, based on the scan of the respective network-connected asset using the first scanning privilege level, whether the respective network-connected asset has a vulnerability. In response to determining that the respective network-connected asset has the vulnerability, the method includes scanning, at the network security scanner using a second scanning privilege level, the respective network-connected asset. The second scanning privilege level defines a lower level of access the network security scanner has to the respective network-connected asset than the first scanning privilege level. The method also includes determining, based on the scan of the respective network-connected asset using the first scanning privilege level and the scan of the respective network-connected asset using the second scanning privilege level, an exposure level of the vulnerability of the respective network-connected asset. The method also includes reporting the exposure level of the vulnerability of the respective network-connected asset to a user of the respective network-connected asset.

This aspect may include one or more of the following optional features. In some implementations, the first and second scanning privilege levels are each associated with a different respective network location relative to the respective network-connected asset. Optionally, the respective network location associated with the first scanning privilege level includes an internal network location. The respective network location associated with the second scanning privilege level may include an external network location.

In some examples, the first scanning privilege level includes a firewall bypass of a firewall associated with the respective network-connected asset. The first and second scanning privilege levels may be among a plurality of scanning privilege levels each defining a different level of access the network security scanner has to the respective network-connected asset and at least one of the plurality of scanning privilege levels may include access credentials providing access to a resource of one or more of the network-connected assets in the set of network-connected assets.

In some implementations, determining the exposure level of the vulnerability includes determining whether the vulnerability is visible to the scan of the respective network-connected asset using the second scanning privilege level. When the vulnerability is visible to the scan of the respective network-connected asset using the second scanning privilege level, the method may include determining that the vulnerability has a first exposure level. When the vulnerability is not visible to the scan of the respective network-connected asset using the second scanning privilege level, the method may include determining that the vulnerability has a second exposure level that is less than the first exposure level.

In some examples, the operations further include performing, based on the exposure level of the vulnerability, a remedial action to mitigate the vulnerability. The operations further may further include, in response to determining that the respective network-connected asset does not have the vulnerability, halting any further scanning of the respective network-connected asset. In some implementations, the first and second scanning privilege levels are among a plurality of scanning privilege levels each defining a different level of access the network security scanner has to the respective network-connected asset and the level of access defined by the first scanning privilege level is higher than the level of access defined by each other scanning privilege level among the plurality of scanning privilege levels.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
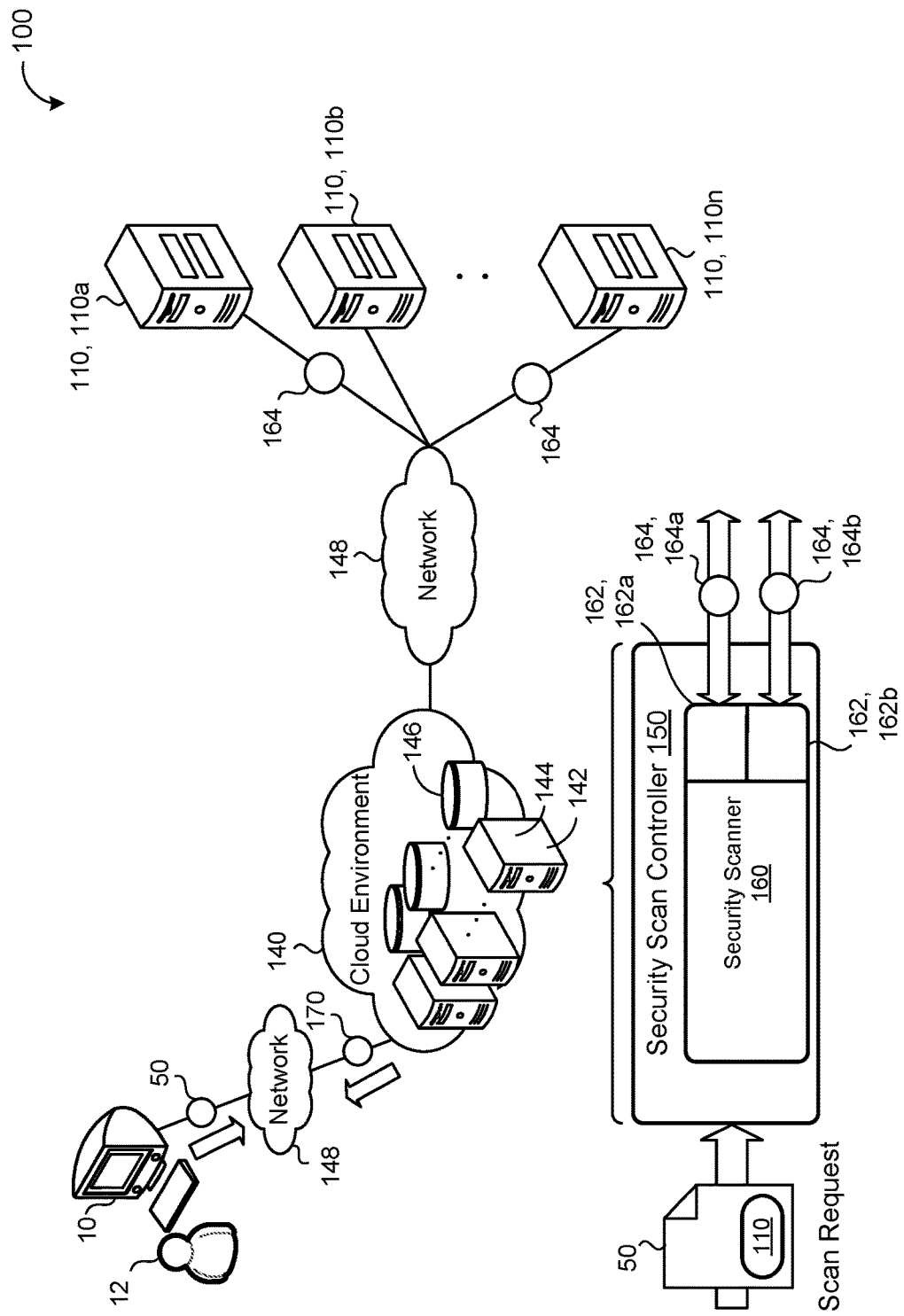
FIG. 1 is a schematic view of an example system for determining exposure levels of vulnerabilities.

Vulnerability scanning is common practice to verify the security state of network-connected assets such as servers, routers, load balancers, applications, etc. Identifying vulnerabilities in network-connected assets and determining the associated risk of the identified vulnerabilities is an important aspect of network security. A critical portion of vulnerability assessment includes determining an exposure level of each vulnerability. The exposure level includes to what extent a vulnerability is accessible to users or attackers. For example, a vulnerability that is exposed to only a small number of company-internal engineers poses much less risk than a vulnerability which is exposed to all users on the Internet. Vulnerability management programs generally aim to discover all vulnerabilities and subsequently prioritize the remediation of more risky vulnerabilities.

In order to detect as many vulnerabilities as possible, security scanning tools typically have broad access to network-connected assets to maximize vulnerability detection rate. This privileged access commonly involves, for example, firewall whitelists and other private network access. However, when this approach detects a vulnerability, it is unclear whether the vulnerability is broadly exposed (and thus should be prioritized) or whether it has limited exposure and was discovered due to the elevated privileges of the scanner.

To account for this disadvantage, security teams may run multiple scans from different trust levels. For example, one scanning tool may scan from a position of the Internet while another scanning tool may scan from a position on an internal network. Subsequently, the security team may merge the overlapping sets of vulnerabilities (i.e., a set intersection) to determine a level of exposure for each vulnerability. However, this approach requires deploying multiple scanners, which increases maintenance overhead. Furthermore, this approach also requires each network-connected asset to be scanned multiple times, which increases resource consumption and scanning-induced disruptions. Moreover, identifying and merging duplicate vulnerabilities is a difficult and time-consuming task that is error prone for a large set of network-connected assets.

Implementations herein are directed toward a security scan controller and security scanner that scans network-connected assets. The security scanner has access to multiple scanning privilege levels and each privilege level defines a different level of access the security scanner has to the network-connected assets. The security scanner scans each network-connected asset using a first scanning privilege level. When the scanner determines a vulnerability using the first scanning privilege level, the scanner scans the respective network-connected asset again using a second scanning privilege level that has a lower level of access than the first scanning privilege level. Based on the scan using the first scanning privilege level and the scan using the second scanning privilege level, the security scan controller determines an exposure level of each vulnerability.

Referring to FIG. 1, in some implementations, an example system 100 includes multiple network-connected assets 110, 110a—n in communication with a computing system 140. The computing system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. Each network-connected asset 110 may include computing resources and memory resources. The network-connected assets 110 may be any physical network device (e.g., a router, load balancer, switch, a server, etc.), a virtualized instance (e.g., a virtual machine), or a single replica of a software application executing on a computing device (e.g., a server).

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The computing system 140 is in communication with the network-connected assets 110 via one or more networks 148. These networks 148 may be any combination of public and private networks. In some examples, some or all of the network-connected assets 110 may be part of a distributed computing system of the computing system 140.

The computing system 140 executes a security scan controller 150. The security scan controller 150 receives or obtains a scan request 50 requesting a scan (e.g., a security scan and/or a vulnerability scan) of a set of the network-connected assets 110. The security scan controller 150 may receive the scan request 50 from a user/administrator 12 (via a user device 10 through a network 148) associated with one or more of the network-connected assets 110. The user device 10 may correspond to any computing device, such as a desktop workstation, a laptop workstation, or a mobile device (i.e., a smart phone).

In some implementations, for each network-connected asset 110 requested to be scanned by the scan request 50, the security scan controller 150 instructs a network security scanner 160 to scan the respective network-connected asset 110. The security scanner 160 may be part of the security scan controller 150 (i.e., executing on the computing system 140) or may be executed by a third party at the command and/or control of the security scan controller 150. The security scanner 160 may invoke any conventional and well known scanning techniques to perform security and/or vulnerability scanning of the network-connected assets 110.

The security scanner 160 includes a first scanning privilege level 162, 162a and a second scanning privilege level 162, 162b. As discussed in more detail below, the scanning privilege levels 162 define a level of access the security scanner 160 has to the respective network-connected asset 110 and the second scanning privilege level 162b defines a lower level of access than the first scanning privilege level 162a. In some implementations, the first scanning privilege level 162a has the highest level of access among each of multiple scanning privilege levels 162 of the security scanner 160.

Figure 2A:
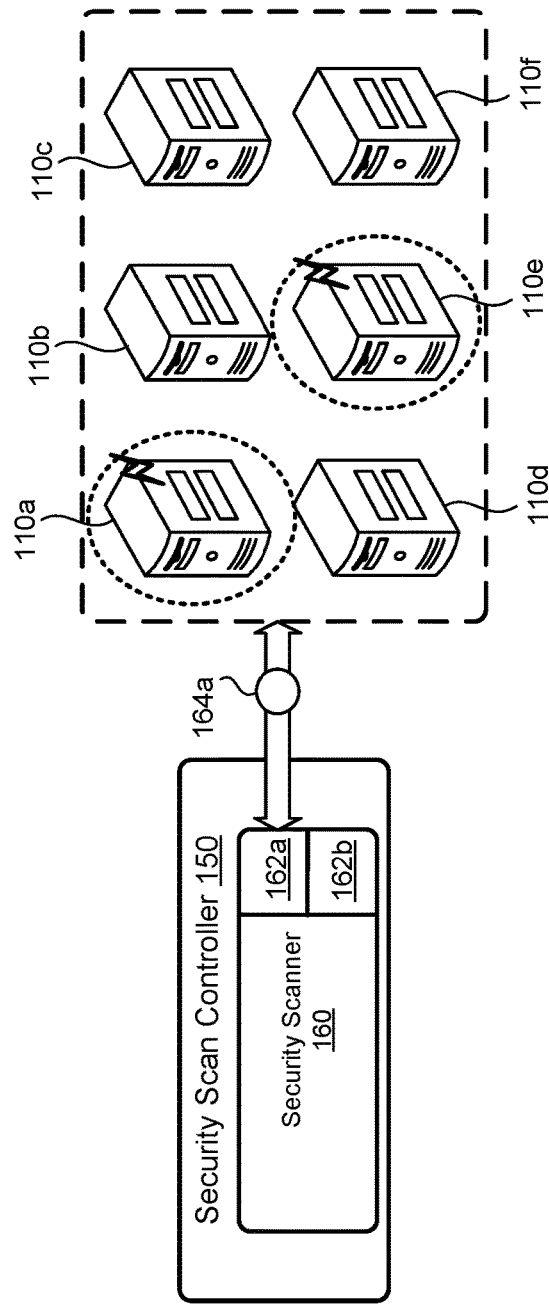
FIGS. 2A and 2B are schematic views of a security scanner scan sets of network-connected assets.

Referring now to FIG. 2A, the security scanner 160 scans each respective network-connected asset 110 using the first scanning privilege level 162a. The security scanner 160 determines, based on the scan of each respective network-connected asset 110, whether the respective network-connected asset 110 has a vulnerability 164, 164a. That is, the security scanner 160 determines whether each respective network-connected asset 110 has a vulnerability 164 that is detectable by the first scanning privilege level 162a. In some examples, when the security scan controller 150 determines that, based on the scan using the first scanning privilege level 162a, a respective network-connected asset 110 does not have a vulnerability 164, the security scan controller 150 halts any further scanning of the respective network-connected asset 110 (i.e., the network-connected asset 110 is only scanned once in total). In the schematic view 200a of FIG. 2A, the security scanner 160 scans an exemplary set of six network-connected assets 110a—f. Here, the security scanner 160 determines that two of the network-connected assets 110a, 110e have vulnerabilities 164a detected by the scan using the first scanning privilege level 162a.

Figure 2B:
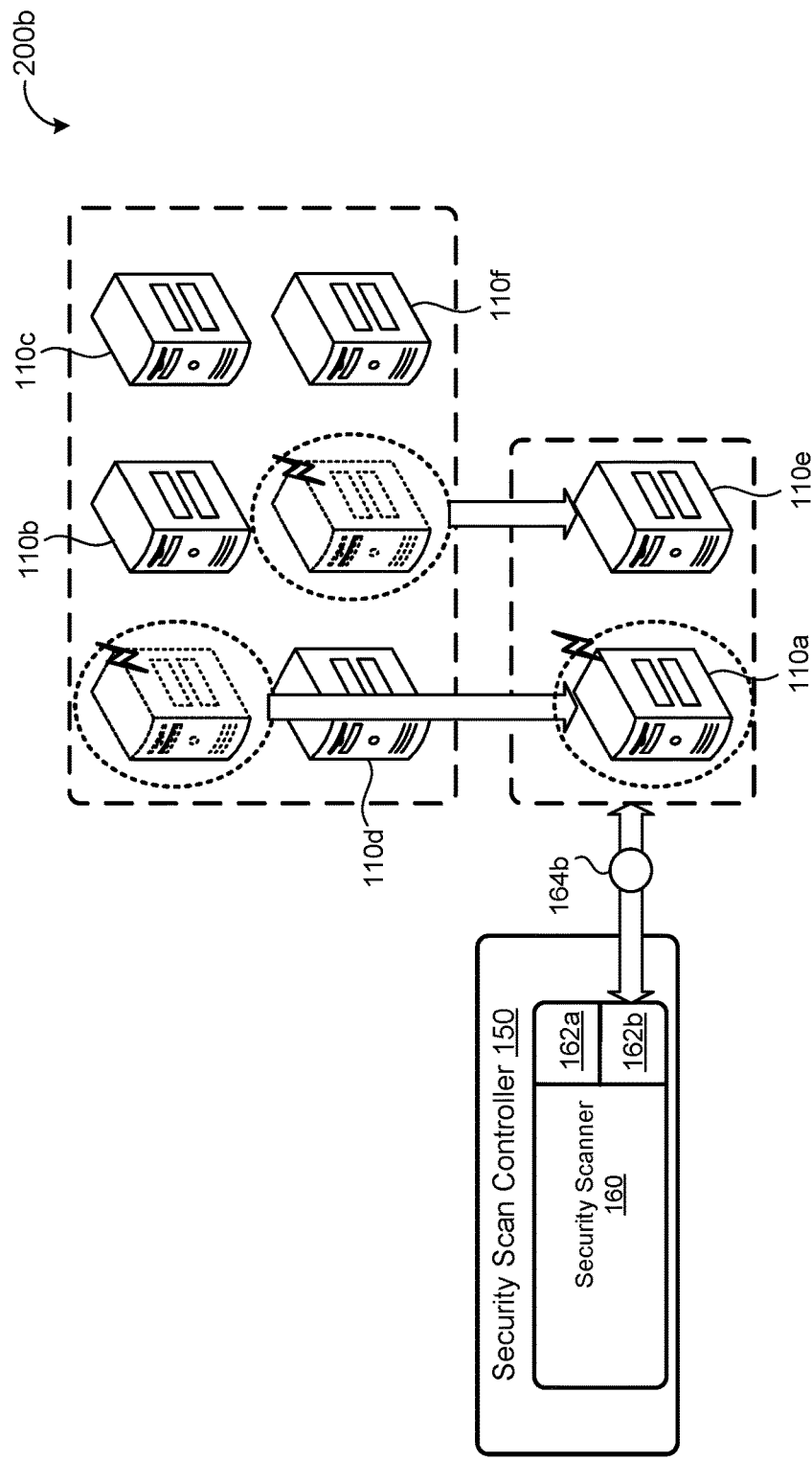

Referring now to FIG. 2B, in response to determining that the respective network-connected asset 110 has the vulnerability 164a, the security scan controller 150 scans, at the network security scanner 160 using the second scanning privilege level 162b, the respective network-connected asset 110. In the schematic view 200b of FIG. 2b, the security scanner 160 uses the second scanning privilege level 162 to now scan the two network-connected assets 110a, 110c that were determined to have the vulnerability 164a from the scan using the first scanning privilege level 162a of FIG. 2A. Here, the security scanner 160 determines that the network-connected asset 110a has a vulnerability 164, 164b using the second scanning privilege level 162b while the network-connected asset 110e does not have the vulnerability 164b.

Put another way, the security scanner 160 scans, using the second scanning privilege level 162b, each network-connected asset 110 that had a vulnerability 164a detected or determined by the security scanner using the first scanning privilege level 162a. The security scanner 160, in some examples, does not scan the remaining network-connected assets 110 (i.e., the network-connected assets 110 that did not have the vulnerability 164a detected using the first scanning privilege level 162a). The vulnerability 164b and the vulnerability 164a may be the same vulnerability 164 detected using different scanning privilege levels 162a, 162b. That is, a vulnerability detected at a lower scanning privilege level 162 is typically also detectable at a higher scanning privilege level 162.

Referring back to FIG. 1, the security scan controller 150 determines, based on the scan of the respective network-connected asset 110 using the first scanning privilege level 162a and the scan of the respective network-connected asset 110 using the second scanning privilege level 162b, an exposure level 170 of the vulnerability 164 of the respective network-connected asset 110. That is, the security scan controller 150 determines the exposure level 170 for each vulnerability 164 determined or detected during the scans of the network-connected assets 110. For example, a vulnerability 164 detected using both the first scanning privilege level 162a and the second scanning privilege level 162b of a respective network-connected asset 110 (such as the network-connected asset 110a of FIGS. 2A and 2B) has a greater exposure level 170 than a vulnerability detected using the first scanning privilege level 162a but not the second scanning privilege level 162b of another respective network-connected asset 110 (such as the network-connected asset 110e of FIGS. 2A and 2B). That is, generally, the more scans (at different scanning privilege levels 162) that the security scanner 160 detects the vulnerability 164, the greater the exposure level 170 of the vulnerability.

Put another way, in some examples, the security scan controller 150 determines the exposure level 170 of each vulnerability 164 (initially detected via a scan using the first scanning privilege level 162a) by determining whether the vulnerability 164 is visible to the scan of the respective network-connected asset 110 using the second scanning privilege level 162b and, when the vulnerability 164 is visible to the scan of the respective network-connected asset 110 using the second scanning privilege level 162b, the security scan controller 150 determines that the vulnerability 164 has a first exposure level 170. In some of these examples, when the vulnerability 164 is not visible to the scan of the respective network-connected asset 110 using the second scanning privilege level 162b, the security scan controller 150 determines that the vulnerability 164 has a second exposure level 170 that is less than the first exposure level 170. Thus, in some implementations, each scanning privilege level 162 determines a "tier" of exposure for each vulnerability 164. Vulnerabilities that are only detected by the scanning privilege level 162 that provides the highest level of access has the lowest exposure level 170 (i.e., most difficult to access) while vulnerabilities 164 that are detected by each of the scanning privilege levels 162 has the highest exposure level 170 (i.e., easiest to access). Based on the number of different scanning privilege levels 162, there may be any number of tiers in between the highest and lowest exposure levels 170.

The security scan controller 150 may scan multiple network-connected assets 110 simultaneously or sequentially. When the security scan controller 150 determines that a respective network-connected asset 110 includes a vulnerability 164, the security scan controller 150 may immediately perform the subsequent scans with the appropriate scanning privilege levels 162 on the respective network-connected asset 110. Alternatively, the security scan controller 150 may complete a scan of all designated network-connected assets 110 with a given scanning privilege level 162 before proceeding with scans using the next scanning privilege level 162.

While examples herein discuss detecting or determining a single vulnerability 164 for respective network-connected assets 110, it is understood that the security scanner 160 may determine or detect any number of vulnerabilities 164 of any number of network-connected assets 110 per scan at each scanning privilege level 162. The security scan controller 150 may correlate vulnerabilities 164 across different scanning privilege levels 162 (i.e., determine whether a vulnerability 164 from two or more different scans represents the same vulnerability 164) based on vulnerability information generated by the security scanner 160 and associated with the vulnerability 164.

In some examples, the security scan controller 150 reports the exposure level 170 of each determined vulnerability 164 for each network-connected asset 110 to the user 12 (e.g., via the user device 10). The report may take any form (e.g., an email, a text message, a push notification, etc.) and may include information identifying the vulnerable network-connected asset 110 and/or the vulnerability 164. Additionally or alternatively, in some examples, the security scan controller 150, based on the exposure levels 170 of the vulnerabilities 164, automatically performs one or more remedial actions. For example, when the exposure level 170 of a respective vulnerability 164 satisfies a threshold level, the security scan controller 150 initiates an action such as disabling or isolating the network-connected asset 110, reducing access (e.g., revoking access credentials 330), or any other action that may mitigate the exposure level 170 or effects of the vulnerability 164.

While examples herein discuss two scanning privilege levels 162, the security scanner 160 may implement any number of levels. For example, the security scanner 160 has three or more scanning privilege levels 162, each defining a different level of access to the network-connected asset 110.

Figure 3:
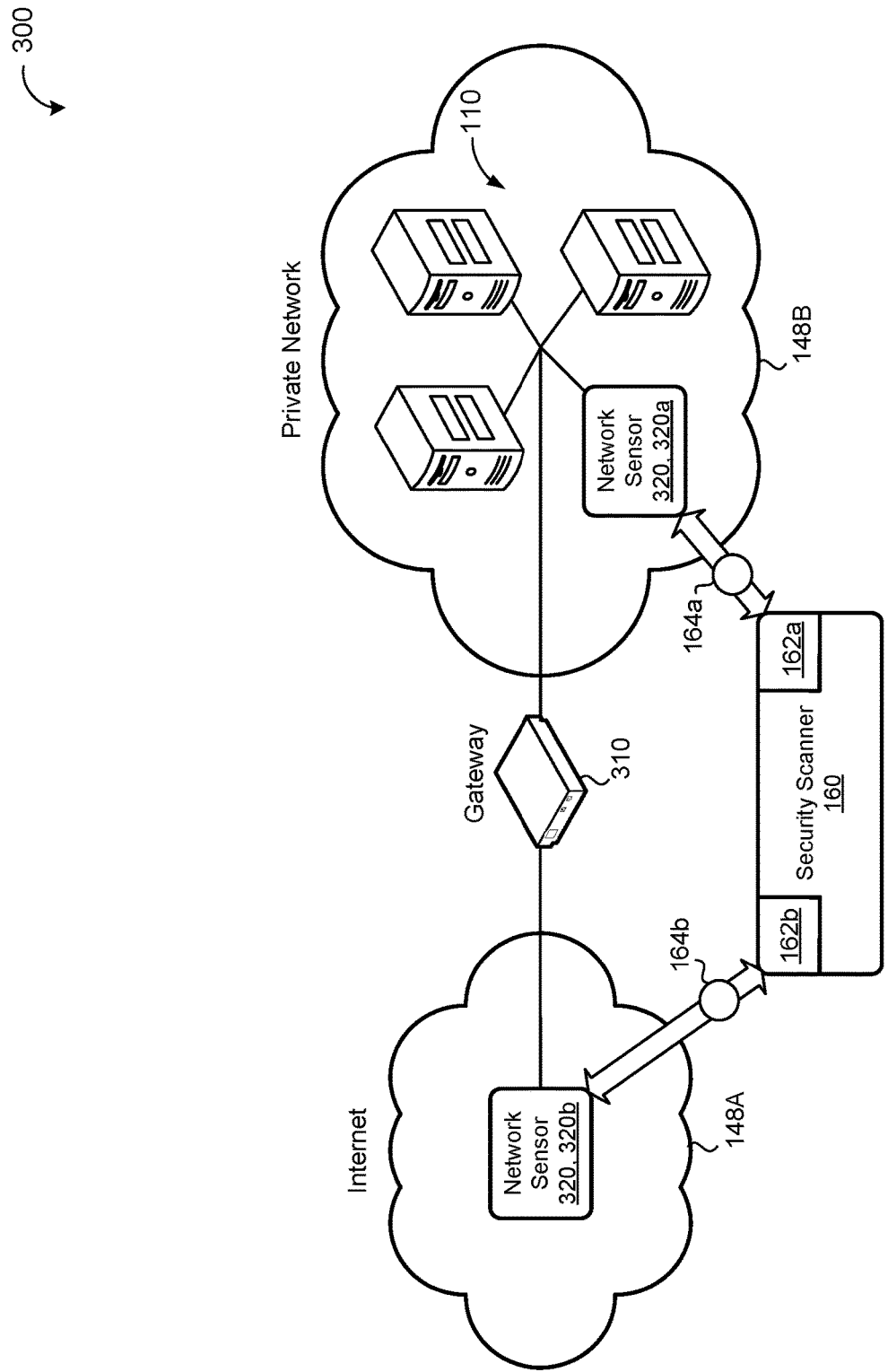
FIG. 3 is a schematic view of the security scanner associated with different network locations.

Referring now to FIG. 3, in some examples, two or more scanning privilege levels 162 are each associated with a different respective network location relative to the respective network-connected asset 110. In schematic view 300, the first scanning privilege level 162a is associated with a network sensor 320, 320a that has a network location within a private network 148B of the network-connected assets 110 being scanned by the security scanner 160. Conversely, the second scanning privilege level 162b is associated with a network sensor 320, 320b that has a network location external to the private network 158B, such as at a public network 148A (e.g., the Internet).

Thus, in this example, the security scanner 160, via the network sensor 320a, performs scans using the first scanning privilege level 162a via the location within the same private network 148B as the network-connected assets 110 and the security scanner 160, via the network sensor 320b, performs scans using the second scanning privilege level 162b via the location external to the private network 148B (e.g., the Internet 148A). This grants the first scanning privilege level 162a a greater level of access to the network-connected assets 110 relative to the second scanning privilege level 162b as generally a gateway 310 or other networking device impedes or otherwise restricts network activity originating from outside the private network 148B. In this way, vulnerabilities 164 detected by scans using the second scanning privilege level 162b will generally also be detected by scans using the first scanning privilege level 162a. However, vulnerabilities 164 detected by scans using the first scanning privilege level 162a may not be detected by scans using the second scanning privilege level 162b, as the vulnerability 164 may be associated with the increased level of access granted to the first scanning privilege level 162a.

Figure 4:
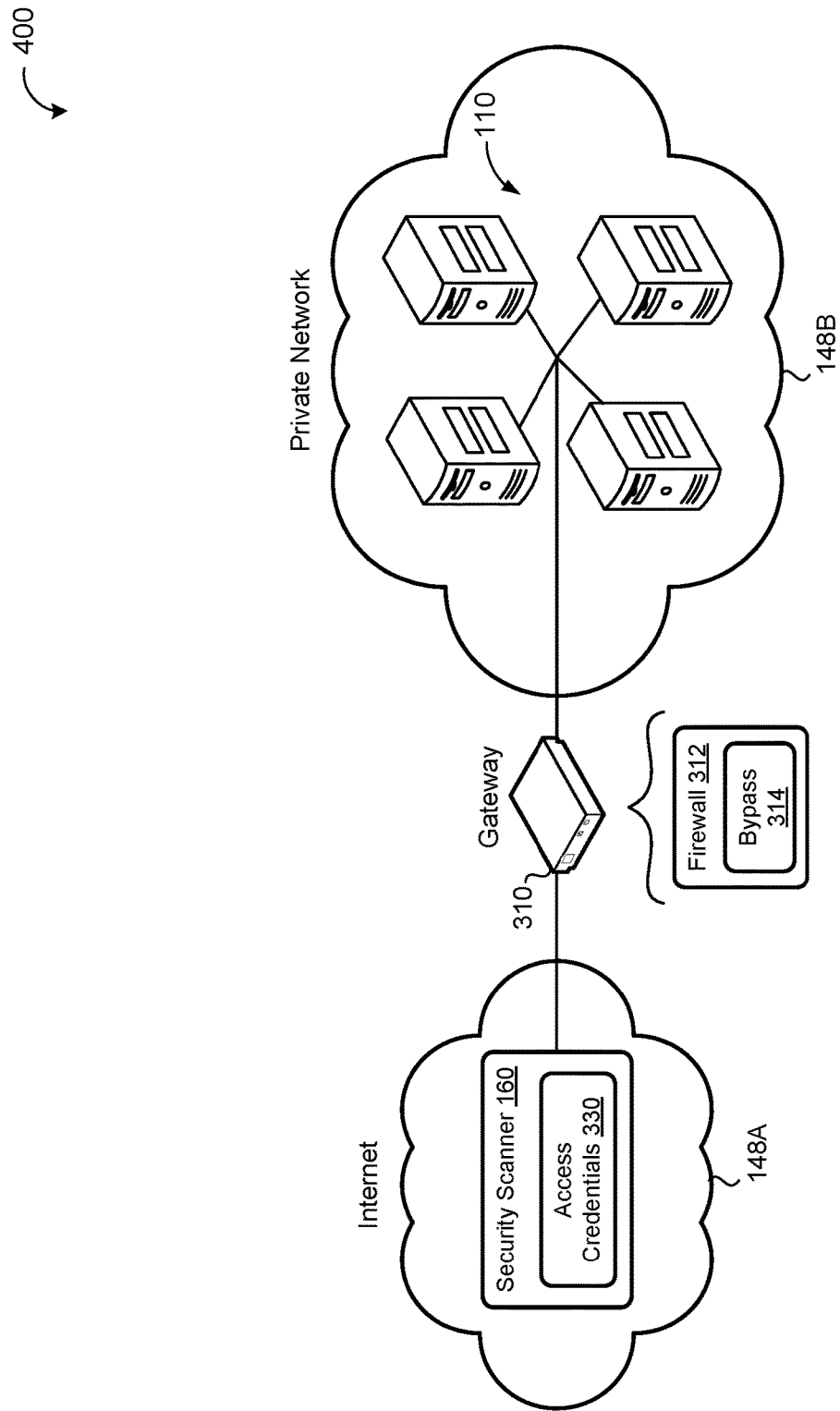
FIG. 4 is a schematic view of the security scanner with a firewall bypass.

Referring now to FIG. 4, schematic view 400 includes the gateway 310, the private network 148B, and the public network 148A of FIG. 3. Here, the gateway 310 includes a firewall 312. In some examples, the first scanning privilege level 162a includes a firewall bypass 314 of the firewall 312 associated with each network-connected asset 110. In this example, the second scanning privilege level 162b is not associated with the firewall bypass 314. Thus, in addition to or alternatively to the different network locations discussed with regards to FIG. 3, different levels of access may be provided to the scanning privilege levels 162 based on firewall rules implemented by the firewall 312.

In some implementations, at least a portion of the level of access provided to each of the scanning privilege levels 162 is based on access credentials 330. For example, one scanning privilege level 162 may not have access to any access credentials 330, while another scanning privilege level 162 may have access to standard or basic access credentials 330, while yet another scanning privilege level 162 may have access to elevated access credentials 330. For example, the basic access credentials 330 are equivalent to access credentials of a normal or basic user of the private network 148B that grants limited access to resources offered by the private network 148B while the elevated access credentials 330 are equivalent to a network security manager or other privileged user of the private network 148B. Based on scans using the different access credentials 330 (i.e., scans using different scanning privilege levels 162), the security scan controller 150 determines the exposure level 170 of vulnerabilities 164. For example, the exposure level 170 of some vulnerabilities 164 may only include privileged employees of a company while the exposure level 170 of other vulnerabilities 164 may include any user with Internet access.

Thus, the system includes a security scan controller and security scanner that determines an exposure level of vulnerabilities in scanned network-connected assets. The system is aware of different scanning privilege levels to automatically and immediately determine the exposure level of a vulnerability. Moreover, network-connected assets are only scanned multiple times when a vulnerability is discovered with a scan from a high privilege mode. Because this is typically a rare event, the majority of network-connected assets are scanned only a single time. Because only a limited number of network-connected assets are scanned multiple times, scanning-induced disruptions is reduced. When multiple scans are necessary (i.e., a vulnerability was discovered), further scans are done in close temporal proximity and thus avoid drift of targets and simplifies vulnerability merging. Furthermore, the system does not require multiple distinct scanner deployments. Instead, a single deployment with multiple privilege tiers is sufficient.

Figure 5:
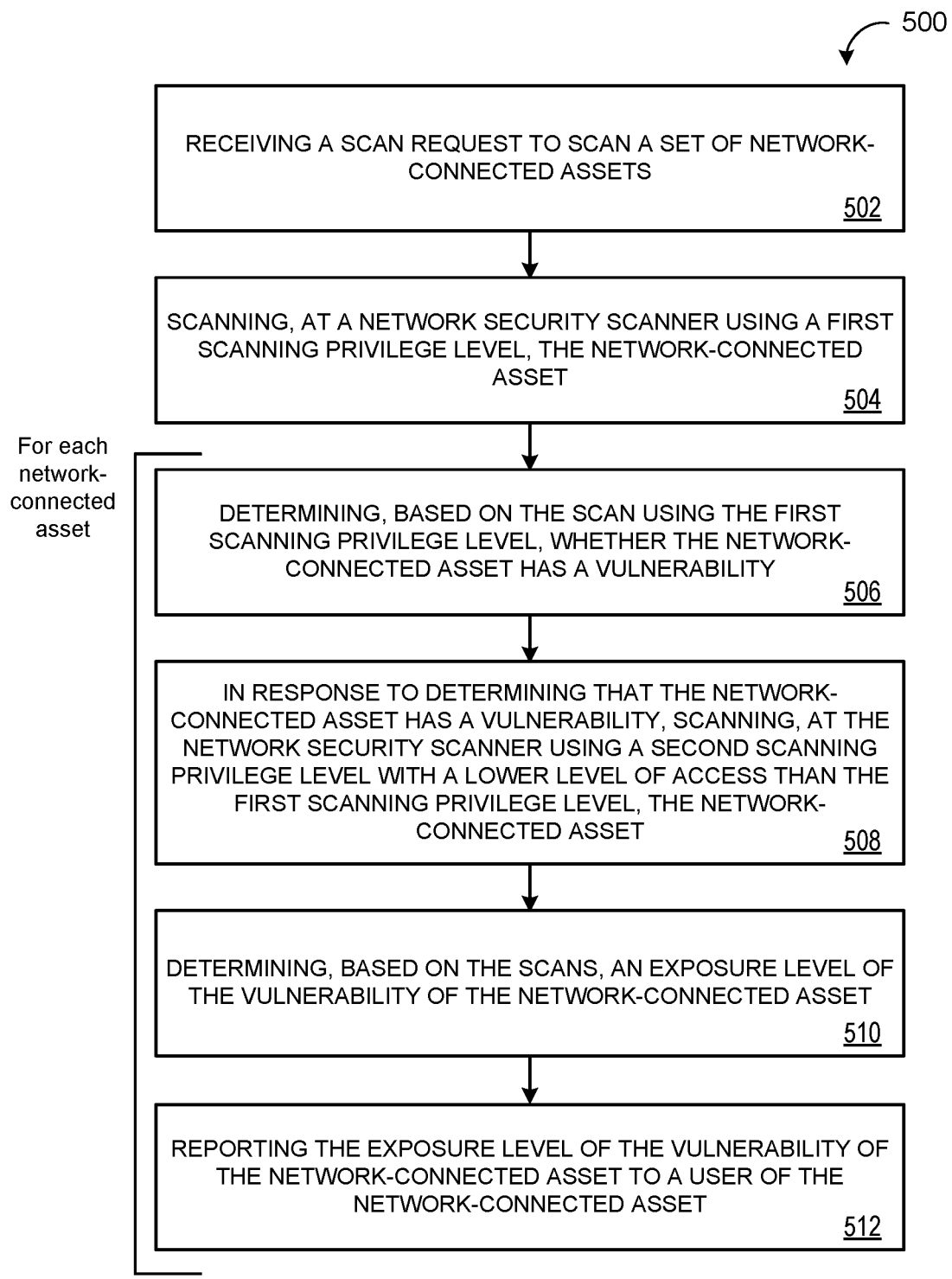
FIG. 5 is a flowchart of an example arrangement of operations for a method of determining an exposure level of vulnerabilities.

FIG. 5 is a flowchart of an exemplary arrangement of operations for a method 500 of determining an exposure level of vulnerabilities. The method 500 includes, at operation 502, receiving a scan request 50 requesting to scan a set of network-connected assets 110. Each network-connected asset 110 in the set of network-connected assets 110 is designated for a network scan. For each respective network-connected asset 110 in the set of network-connected assets 110, the method 500, at operation 504, includes scanning, at a network security scanner 160 using a first scanning privilege level 162a, the respective network-connected asset 110. At operation 506, the method 500 includes determining, based on the scan of the respective network-connected asset 110 using the first scanning privilege level 162a, whether the respective network-connected asset 110 has a vulnerability 164. In response to determining that the respective network-connected asset 110 has the vulnerability 164, the method 500 includes, at operation 508, scanning, at the network security scanner 160 using a second scanning privilege level 162b, the respective network-connected asset 110. The second scanning privilege level 162b defines a lower level of access the network security scanner 160 has to the respective network-connected asset 110 than the first scanning privilege level 162a. At operation 510, the method 500 includes determining, based on the scan of the respective network-connected asset 110 using the first scanning privilege level 162a and the scan of the respective network-connected asset 110 using the second scanning privilege level 162b, an exposure level 170 of the vulnerability 164 of the respective network-connected asset 110. The method 500, at operation 512, includes reporting the exposure level 170 of the vulnerability 164 of the respective network-connected asset 110 to a user 12 of the respective network-connected asset 110.

Figure 6:
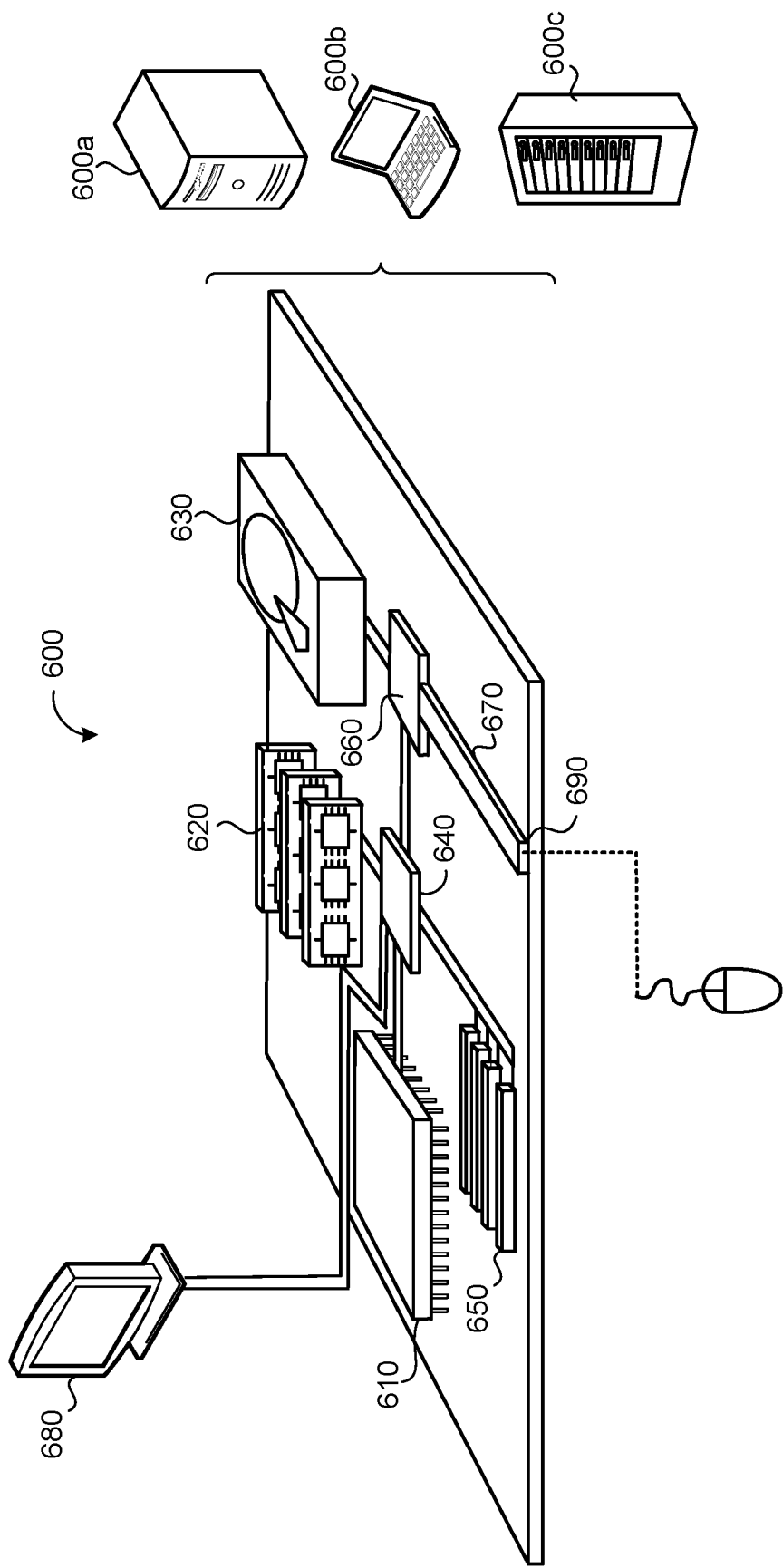
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    receiving a scan request requesting to scan a set of network-connected assets, each network-connected asset in the set of network-connected assets designated for a network scan; and
    for each respective network-connected asset in the set of network-connected assets scanning, at a network security scanner using a first scanning privilege level, the respective network-connected asset for a vulnerability;
    for only each respective network-connected asset in the set of network-connected assets that has a vulnerability:
        scanning, at the network security scanner using a second scanning privilege level, the respective network-connected asset, the second scanning privilege level defining a lower level of access the network security scanner has to the respective network-connected asset than the first scanning privilege level;
        determining, based on the scan of the respective network-connected asset using the first scanning privilege level and the scan of the respective network-connected asset using the second scanning privilege level, an exposure level of the vulnerability of the respective network-connected asset; and
        reporting the exposure level of the vulnerability of the respective network-connected asset to a user of the respective network-connected asset.

2. The method of claim 1, wherein the first and second scanning privilege levels are each associated with a different respective network location relative to the respective network-connected asset.

3. The method of claim 2, wherein the respective network location associated with the first scanning privilege level comprises an internal network location.

4. The method of claim 2, wherein the respective network location associated with the second scanning privilege level comprises an external network location.

5. The method of claim 1, wherein the first scanning privilege level comprises a firewall bypass of a firewall associated with the respective network-connected asset.

6. The method of claim 1, wherein:
the first and second scanning privilege levels are among a plurality of scanning privilege levels each defining a different level of access the network security scanner has to the respective network-connected asset; and
at least one of the plurality of scanning privilege levels comprises access credentials providing access to a resource of one or more of the network-connected assets in the set of network-connected assets.

7. The method of claim 1, wherein determining the exposure level of the vulnerability comprises:
determining whether the vulnerability is visible to the scan of the respective network-connected asset using the second scanning privilege level; and
when the vulnerability is visible to the scan of the respective network-connected asset using the second scanning privilege level, determining that the vulnerability has a first exposure level.

8. The method of claim 7, wherein, when the vulnerability is not visible to the scan of the respective network-connected asset using the second scanning privilege level, determining that the vulnerability has a second exposure level that is less than the first exposure level.

9. The method of claim 1, wherein the operations further comprise performing, based on the exposure level of the vulnerability, a remedial action to mitigate the vulnerability.

10. The method of claim 1, wherein the operations further comprise, in response to determining that the respective network-connected asset does not have the vulnerability, halting any further scanning of the respective network-connected asset.

11. The method of claim 1, wherein:
the first and second scanning privilege levels are among a plurality of scanning privilege levels each defining a different level of access the network security scanner has to the respective network-connected asset; and
the level of access defined by the first scanning privilege level is higher than the level of access defined by each other scanning privilege level among the plurality of scanning privilege levels.

12. A system comprising:
data processing hardware; and
memory hardware in communication with the data processing hardware, the memory hardware storing instructions that when executed on the data processing hardware cause the data processing hardware to perform operations comprising:
receiving a scan request requesting to scan a set of network-connected assets, each network-connected asset in the set of network-connected assets designated for a network scan; and
for each respective network-connected asset in the set of network-connected assets scanning, at a network security scanner using a first scanning privilege level, the respective network-connected asset for a vulnerability;
for only each respective network-connected asset in the set of network-connected assets that has a vulnerability:
scanning, at the network security scanner using a second scanning privilege level, the respective network-connected asset, the second scanning privilege level defining a lower level of access the network security scanner has to the respective network-connected asset than the first scanning privilege level;
determining, based on the scan of the respective network-connected asset using the first scanning privilege level and the scan of the respective network-connected asset using the second scanning privilege level, an exposure level of the vulnerability of the respective network-connected asset; and
reporting the exposure level of the vulnerability of the respective network-connected asset to a user of the respective network-connected asset.

13. The system of claim 12, wherein the first and second scanning privilege levels are each associated with a different respective network location relative to the respective network-connected asset.

14. The system of claim 13, wherein the respective network location associated with the first scanning privilege level comprises an internal network location.

15. The system of claim 13, wherein the respective network location associated with the second scanning privilege level comprises an external network location.

16. The system of claim 12, wherein the first scanning privilege level comprises a firewall bypass of a firewall associated with the respective network-connected asset.

17. The system of claim 12, wherein:
the first and second scanning privilege levels are among a plurality of scanning privilege levels each defining a different level of access the network security scanner has to the respective network-connected asset; and
at least one of the plurality of scanning privilege levels comprises access credentials providing access to a resource of one or more of the network-connected assets in the set of network-connected assets.

18. The system of claim 12, wherein determining the exposure level of the vulnerability comprises:
determining whether the vulnerability is visible to the scan of the respective network-connected asset using the second scanning privilege level; and
when the vulnerability is visible to the scan of the respective network-connected asset using the second scanning privilege level, determining that the vulnerability has a first exposure level.

19. The system of claim 18, wherein, when the vulnerability is not visible to the scan of the respective network-connected asset using the second scanning privilege level, determining that the vulnerability has a second exposure level that is less than the first exposure level.

20. The system of claim 12, wherein the operations further comprise performing, based on the exposure level of the vulnerability, a remedial action to mitigate the vulnerability.

21. The system of claim 12, wherein the operations further comprise, in response to determining that the respective network-connected asset does not have the vulnerability, halting any further scanning of the respective network-connected asset.

22. The system of claim 12, wherein:
the first and second scanning privilege levels are among a plurality of scanning privilege levels each defining a different level of access the network security scanner has to the respective network-connected asset; and
the level of access defined by the first scanning privilege level is higher than the level of access defined by each other scanning privilege level among the plurality of scanning privilege levels.

* * * * *